No. 726,340. PATENTED APR. 28, 1903.
F. W. PORSCH.
LIGHT TRANSMITTER.
APPLICATION FILED DEC. 31, 1901.
NO MODEL.
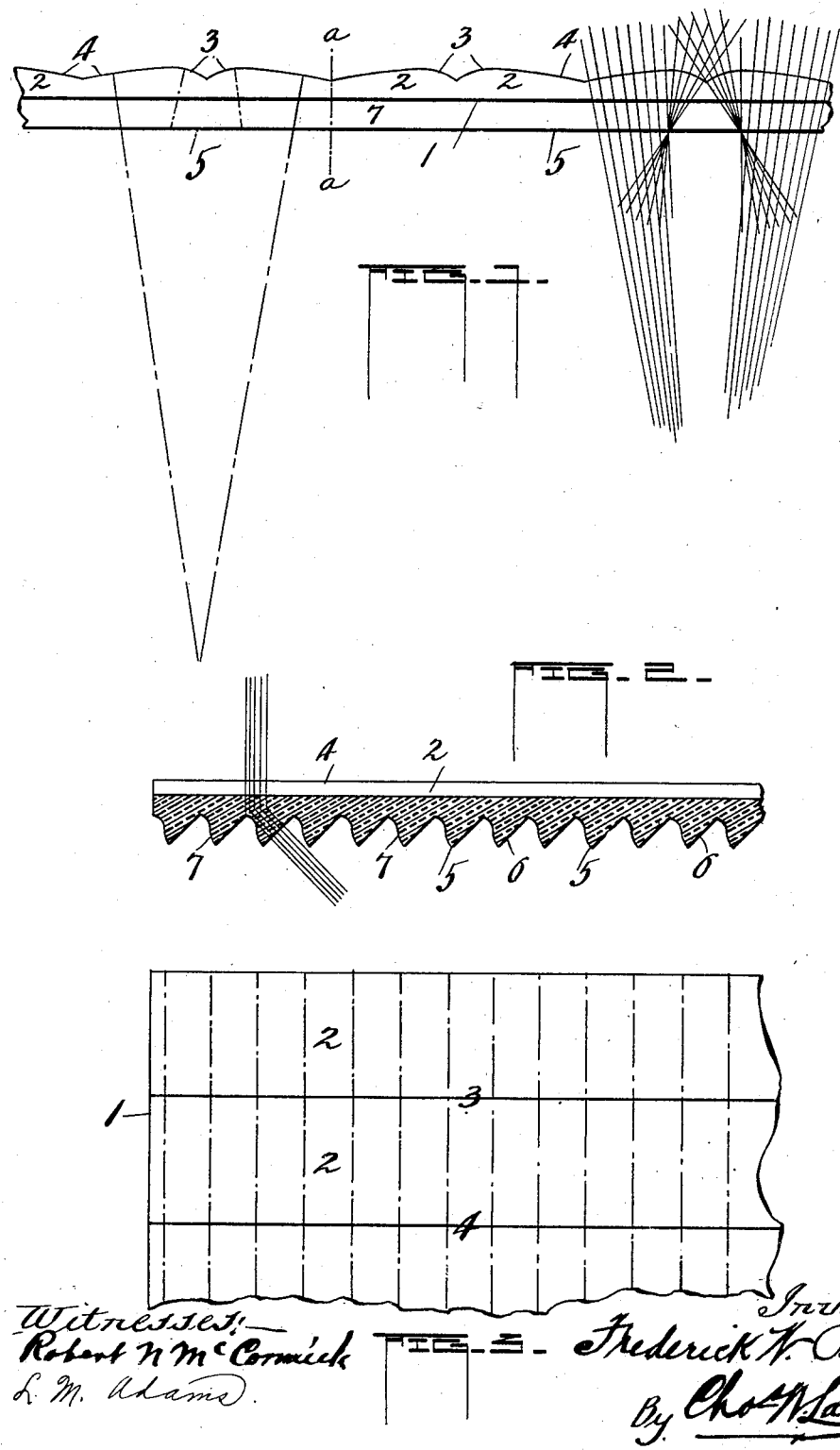

UNITED STATES PATENT OFFICE.

FREDERICK W. PORSCH, OF OTTAWA, ILLINOIS.

LIGHT-TRANSMITTER.

SPECIFICATION forming part of Letters Patent No. 726,340, dated April 28, 1903.

Application filed December 31, 1901. Serial No. 87,893. (No model.)

*To all whom it may concern:*

Be it known that I, FREDERICK W. PORSCH, a citizen of the United States, residing at Ottawa, in the county of Lasalle and State of Illinois, have invented certain new and useful Improvements in Light-Transmitters; and I do hereby declare that the following is a full, clear, and exact description of the invention, which will enable others skilled in the art to which it appertains to make and use the same.

This invention has reference to panes of translucent or transparent material for diffusing and distributing light to the interior of rooms, store-buildings, cellars, &c., and has for its object to provide the new and improved prism-light for this purpose, illustrated in the accompanying drawings, in which—

Figure 1 is an edge view of the pane or light looking at the longitudinal side of the prism. Fig. 2 is a transversely-arranged cross-section as would appear on the line $a\,a$ of Fig. 1. Fig. 3 is a plan of a piece of my improved pane.

This invention consists in a new article of manufacture which comprises a pane or light of transparent material made in pieces of suitable size and upon its receiving-face is provided with suitable lenses. The lenses are substantially elliptical in form and disposed so that the short radii of each lens is adjacent or join each other and the long radius of each lens are adjacent to and join each other substantially in the manner as illustrated in the figures, and upon the opposite face of the pane is arranged a series of substantially triangular prismatic ribs or projections, which are made integral with the body of the pane and are disposed at right angles to the lenses.

One side of the rib is shown having a flat surface and the other a concavo-convex surface, the concavo surface being the one adjacent to the lens and leading into the body of the pane. The arrangement of the lenses and the disposition of the prismatic ribs, as illustrated, is such that any rays of light, whether they be perpendicular or oblique, will be refracted by the elliptical lenses and serve to cause lateral diffusion of the light projected by the pane, and thereby correspondingly increase the area which can be effectually illuminated. In Fig. 1 this diffusion of the light may be more clearly seen, which also illustrates how the perpendicular and oblique rays will be refracted through the lens. The rays which pass through the long and short radius which forms the ellipse of each lens are diffused at the outer points or where the convex and straight surfaces of the prismatic projections unite. In Fig. 2 is illustrated the perpendicular rays which are refracted by the lenses onto the prisms and striking the concave surfaces thereof are deflected to and refracted by the plane surfaces of the prismatic projections.

The invention is designed for use as light-transmitters for skylights, window-panes, passages in halls of buildings, vault-lights, and for many other and various uses. The panes may be disposed so that the lenses bear vertically, horizontally, or obliquely either for throwing the light up or down or in lateral directions. The construction of the lenses whose surfaces are elliptical in form, each of which having a long and short radius, will accommodate rays of light bearing in perpendicular or oblique lines and refract them in the manner herein stated.

It is to be noticed that by refracting the rays of light through the lenses and diffusing them at the base of the prismatic ribs the light is not only caused to be diffused over a large area, but that by reason of the concavo-convex side of the ribs a prismatic effect or spectrum is produced which is similar to an electrical font.

In the drawings, 1 refers to a pane or plate of transparent material, which may be of any size. On its receiving side is arranged a series of lenses 2, presenting a substantially elliptical curve—that is to say, each lens is formed of a curve having two radii of different lengths—and the arrangement of the lenses on the plate is such as to bring the short radius of the adjoining lenses adjacent and the same alternate disposition of the opposite radius, the short curve referred to as 3 and the long curve as 4. Upon the opposite side and arranged at right angles to the lenses is shown a series of prismatic ribs or projections 5, each of which has a straight or refracting surface 6, the opposite side having an irregular surface 7, which is substantially concavo-convex in form or S-shaped, as shown. The object of this construction is to make a strong brilliant illumination, refracted by the straight flat side of the ribs of rays which are deflected by the irregular surface of the opposite side of the rib, which said rays are defracted by the lenses 2—that is to say, any rays of light passing through the lenses 2 which fall upon the inner concave face of the ribs 5 the same acts as a lens to deflect the rays falling thereupon to be refracted through and from the opposite side, which is the flat surface of the rib, and all rays of light which are diffused or which pass through the lenses 2 and center upon the convex lower surface of the ribs 5 a shadow will be cast by such diffusion and will produce a perfect prismatic or spectrum effect.

I am aware that light-transmitters and light-projecting panes of glass have been made where the attempt has been to accommodate rays of light falling in perpendicular or oblique rays. In each instance it has had to be one or the other, and further attempts have been made to cause a lateral diffusion of the light and also attempts have been made to deflect the rays of light from the receiving to the defracting surface of the pane. In this latter instance it was necessary to place the receiving-surface in approximately a horizontal plane; but in my light transmitter or prism I have not only arranged to receive the rays of light in different planes and cause it to be diffused over a large area, but have also by the peculiar construction and arrangement of my prismatic ribs strengthened and deflected the rays which are refracted by the opposite side of the ribs. The peculiar commingling of the rays as they center upon the lower convex portion of the ribs produces a light which has the appearance of an electrical font.

While I have shown the lenses arranged at right angles to the prismatic ribs, I do not wish to confine myself to such construction, as they may be disposed parallel therewith, if desired, or the lenses may be arranged at angles opposite to each other—that is to say, at right angles to and parallel with the prismatic ribs, if desired—without effecting the principle of invention herein.

Having thus fully described my invention, what I claim, and desire to secure by Letters Patent of the United States, is—

1. A light-transmitter, having upon one face a series of lenses, each lens substantially elliptical in form, and upon the other face a series of prismatic ridges each ridge having a flat refracting-face and upon the opposite side thereof a concavo-convex deflecting-face, substantially as described.

2. As a new article of manufacture, a light-transmitter made of transparent material and provided on one side with a series of lenses, the curve of said lenses struck from centers with radii of different lengths, and upon the other side with a series of substantially prismatic ribs, one side of which has a flat refracting-surface and the other side forming an S-curve, the concave portion of which leads into the body of the pane, and constructed substantially in the manner and for the purpose described.

3. In a light-transmitter, the combination of a glass body having a receiving-face of lenses that are substantially elliptical in form and disposed so that the short radii of each lens are adjacent, a series of prisms upon the opposite face of the body extending at right angles to the lens having a deflecting-surface of an irregular curve for the purpose of deflecting light refracted by the lenses to the refracting side of the prism, substantially as described.

4. As a new article of manufacture, a prism-light comprising a body of transparent material having on its receiving-face a series of parallel convex projections, each of which is bounded by an arc of a circle whose radius is struck from two independent centers which cross each other, the arcs of said projections which are struck from the long radius intersecting, in combination with a series of prismatic ribs arranged upon the opposite side of the light and at right angles to said convex projections, the said ribs having a substantially flat face and an irregular face, as and for the purpose described.

In testimony whereof I affix my signature in presence of two witnesses.

FREDERICK W. PORSCH.

Witnesses:
CHAS. W. LA PORTE,
J. E. STRAWN.